(12) United States Patent
Gadiraju et al.

(10) Patent No.: US 11,619,206 B2
(45) Date of Patent: Apr. 4, 2023

(54) SYSTEM AND METHOD FOR CONTROLLING A POWER GENERATING UNIT

(71) Applicant: GENERAL ELECTRIC COMPANY, Schenectady, NY (US)

(72) Inventors: Kasi Viswanadha Raju Gadiraju, Bangalore (IN); Deepak Aravind, Bangalore (IN); Deepak Raj Sagi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/309,494

(22) PCT Filed: Jun. 21, 2017

(86) PCT No.: PCT/US2017/038579
§ 371 (c)(1),
(2) Date: Dec. 13, 2018

(87) PCT Pub. No.: WO2017/223222
PCT Pub. Date: Dec. 28, 2017

(65) Prior Publication Data
US 2019/0131795 A1    May 2, 2019

(30) Foreign Application Priority Data
Jun. 21, 2016 (IN) .............................. 201641021228

(51) Int. Cl.
*F03D 7/04* (2006.01)
*F03D 7/02* (2006.01)
(Continued)

(52) U.S. Cl.
CPC ........... *F03D 7/0284* (2013.01); *F03D 7/048* (2013.01); *G05B 13/042* (2013.01); *H02J 3/242* (2020.01);
(Continued)

(58) Field of Classification Search
CPC ........ H02J 3/386; H02J 2203/20; H02J 3/242; H02J 3/381; H02J 2300/28; F03D 7/0284;
(Continued)

(56) References Cited

U.S. PATENT DOCUMENTS 8,600,572 B2    12/2013  Sri-Jayantha
2010/0237834 A1*  9/2010  Alonso Sadaba ....... H02J 3/381
                                                           323/205
(Continued)

FOREIGN PATENT DOCUMENTS

| EP | 2236820 A2 | 10/2010 |
| EP | 2876768 A1 | 5/2015 |
| EP | 2963757 A1 | 1/2016 |
| WO | 20150179139 A1 | 11/2015 |
| WO | 2016062316 A1 | 4/2016 |

OTHER PUBLICATIONS

B. de Metz-Noblat, F. Dumas, C. Poulain, Calculation of short-circuit currents, Cahier technique No. 158, Sep. 2005, Schneider Electric, pp. 11 and 25 (Year: 2005).*
(Continued)

*Primary Examiner* — Michael W Choi
(74) *Attorney, Agent, or Firm* — Dority & Manning, P.A.

(57) ABSTRACT

A method for controlling a power output of a power generating unit includes receiving at least two measurement data sets from a location of integration of a power generating unit to an electrical grid. Each measurement data set includes a plurality of electrical parameters. The method further includes generating a grid model of the electrical grid based on the at least two measurement data sets. The grid model is characterized by an equivalent grid voltage and an equiva-
(Continued)

lent grid impedance. The method further includes computing a strength value of the electrical grid based on the grid model, using the at least two measurement data sets. The method also includes controlling the power output of a power generating unit based on the strength value of the electrical grid.

4 Claims, 6 Drawing Sheets

(51) Int. Cl.
*H02J 3/24* (2006.01)
*H02J 3/38* (2006.01)
*G05B 13/04* (2006.01)

(52) U.S. Cl.
CPC ........... *H02J 3/381* (2013.01); *H02J 2203/20* (2020.01); *H02J 2300/28* (2020.01); *Y02E 10/72* (2013.01); *Y02E 10/76* (2013.01); *Y02E 60/00* (2013.01); *Y04S 40/20* (2013.01)

(58) Field of Classification Search
CPC ..... F03D 7/048; G05B 13/042; Y02E 10/723; Y02E 10/763; Y02E 60/76; Y02E 10/72; Y02E 10/76; Y02E 60/00; Y02E 40/70; Y04S 40/22; Y04S 40/20; Y04S 10/22
USPC ........................................................ 700/287
See application file for complete search history.

(56) References Cited

U.S. PATENT DOCUMENTS

| | | | |
|---|---|---|---|
| 2015/0120228 A1* | 4/2015 | Kosaka | G01R 27/16 702/65 |
| 2015/0148974 A1 | 5/2015 | Diedrichs | |
| 2015/0198145 A1* | 7/2015 | Diedrichs | F03D 7/048 700/287 |
| 2015/0361954 A1* | 12/2015 | Nelson | G05F 1/66 700/287 |
| 2015/0369217 A1* | 12/2015 | Gupta | H02J 3/16 290/44 |
| 2016/0087445 A1* | 3/2016 | Beekmann | H02J 3/386 307/52 |
| 2016/0233830 A1* | 8/2016 | Kouno | H02S 50/10 |
| 2017/0346287 A1* | 11/2017 | Choi | H02J 3/26 |

OTHER PUBLICATIONS

Salehi et al. (V. Salehi, A. Mazloomzadeh, O. Mohammed, Development and Implementation of a Phasor Measurement Unit for Real-Time Monitoring, Control and Protection of Power Systems, IEEE, document 978-1-4577-1002-5/11, May 2011) (Year: 2011).*
PCT Search Report and Written Opinion issued in connection with corresponding Application No. PCT/US2017/038579 dated Sep. 26, 2017.
Examination Report for India patent application No. 201641021228, dated Jun. 28, 2019.

* cited by examiner

SYSTEM AND METHOD FOR CONTROLLING A POWER GENERATING UNIT

BACKGROUND

Embodiments of the present invention relate generally to power generating units, and more particularly to a system and a method for effectively controlling a power generating unit integrated with an electric gird.

In general, an electrical grid includes a plurality of power generating units and transmission lines interconnecting power generating stations with consumers. Stability of a power system is related to the ability of the electrical grid to maintain a system voltage. Power systems having a greater strength value experience smaller voltage change at a location of integration of the power generating unit with the electrical grid during an injection of reactive power compared to power systems having a lower strength value. The strength value of the power system is quantified by a short circuit ratio (SCR) defined as a ratio of a short circuit MVA (before connecting a generator to the grid) to the MW value of the generator. Power systems having smaller SCR values may experience un-damped voltage oscillations due to fast response of voltage controllers associated with the power generation units, especially renewable energy sources. Reduction of voltage controller gains may slow down the response time of the voltage controllers, thereby reducing variations of voltage oscillations. The slow response of the voltage controllers would delay voltage recovery during start up conditions and other contingency situations.

The system strength value varies in response to changes in operating states of the electrical grid such as switching of generator, loads, lines, and transformers. The system strength value may also change due to augmentation of grid infrastructure. Hence, use of the system strength value determined at the time of commissioning of operation of the power generating unit is not effective. The power system can be operated more efficiently if the strength value is available in real time. However, access to grid data for assessing strength value is not provided by the grid operators and regulatory authorities.

BRIEF DESCRIPTION

In accordance with one embodiment of the present invention, a method is disclosed. The method includes receiving at least two measurement data sets from a location of integration of a power generating unit to an electrical grid. Each measurement data set includes a plurality of electrical parameters. The method further includes generating a grid model of the electrical grid based on the at least two measurement data sets. The grid model is characterized by an equivalent grid voltage and an equivalent grid impedance. The method further includes computing a strength value of the electrical grid based on the grid model, using the at least two measurement data sets. The method also includes controlling a power output of the power generating unit based on the strength value.

In accordance with another embodiment of the present invention, a system for controlling a power generating unit coupled to an electrical grid is disclosed. The system includes a signal acquisition unit communicatively coupled to the power generating unit and configured to acquire at least two measurement data sets from a location of integration of the power generating unit to the electrical grid. Each measurement set includes a plurality of electrical parameters. The system further includes a power generation controller communicatively coupled to the power generating unit and the signal acquisition unit and configured to receive the at least two measurement data sets and generate a grid model of the electrical grid based on the at least two measurement data sets. The grid model is characterized by an equivalent grid voltage and an equivalent grid impedance. The power generation controller is further configured to compute a strength value of the electrical grid based on the grid model, using the at least two measurement data sets. The power generation controller is also configured to control power output of the power generating unit based on the strength value.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail herein, a system and a method for effectively controlling a power generating unit integrated with an electrical grid are disclosed. More particularly, a system and a method for controlling a power output of the power generating unit to enhance power transfer and stability of the power generating unit are disclosed. At least two measurement data sets are received from a location of integration of the power generating unit to the electrical grid. A grid model of the electrical grid is generated based on the at least two measurement data sets. A strength value of the electrical grid is computed based on the grid model using the at least two measurement data sets. A power output of the power generating unit is controlled based on the strength value.

The term "power generating unit" refers to any electrical power source with a wind farm being shown and described herein as example. The term "electrical grid" refers to a network interconnecting a plurality of power generating stations and individual customers through a plurality of high-voltage transmission lines that transmit power. The term "location of integration" refers to a location where the power generating unit is connected to the electrical grid. The term "location of integration" referred herein is used equivalently and interchangeably with the terms "point of common coupling (PCC)" and "point of interconnection (POI)". The term "strength value of the electrical grid" refers to a capability of the electrical grid to receive power from the power generating unit.

Figure 1:
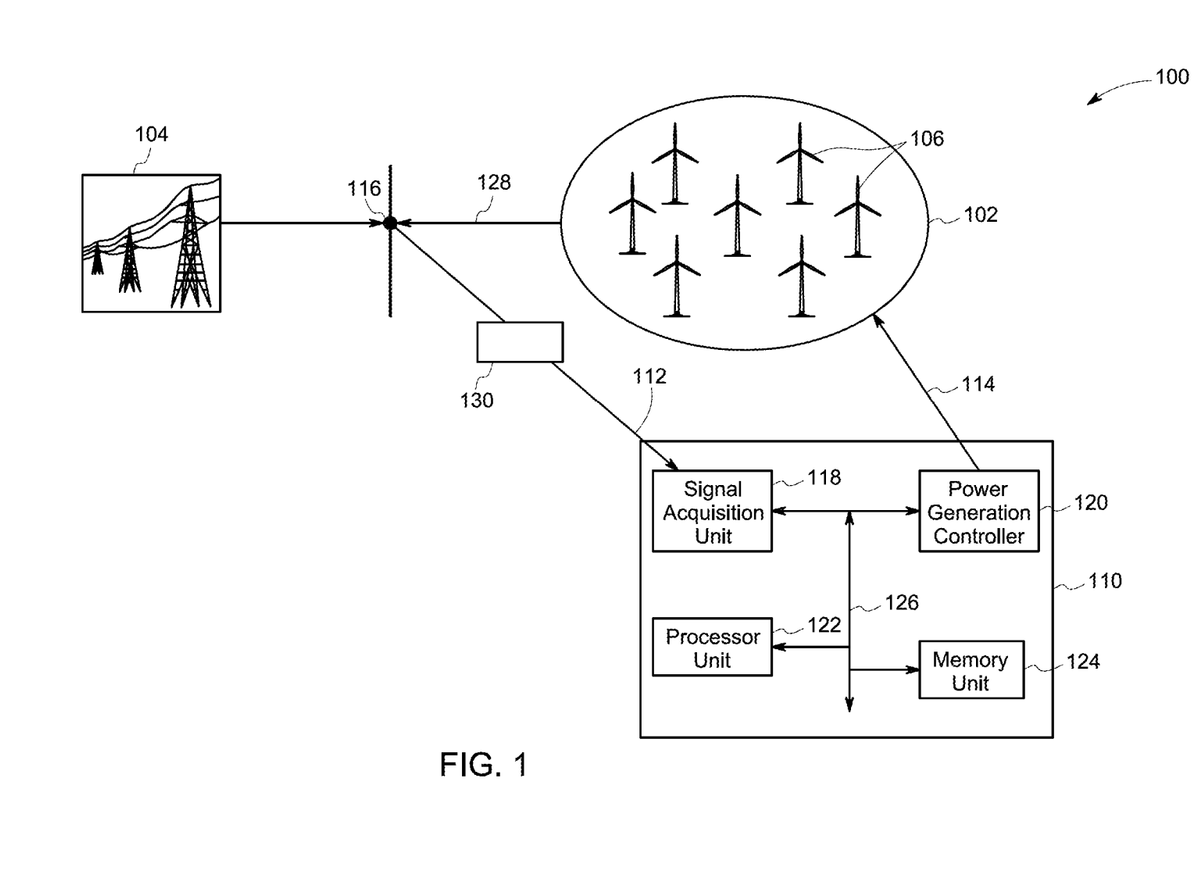
FIG. 1 is a diagrammatic illustration of a system for effectively controlling a power generating unit integrated with an electrical grid in accordance with an exemplary embodiment.

FIG. 1 is a diagrammatic illustration of a power system (100) having a system (110) for effectively controlling a power generating unit (102) integrated with an electrical grid (104) in accordance with an exemplary embodiment. Specifically, the power generating unit (102) is coupled to the electrical grid (104) through a location of integration (116). In the illustrated embodiment, the power generating unit (102) includes a wind farm having a plurality of wind turbines (106). The system (110) is configured to receive measurement data sets from the location of integration (116) through a sensor module (130) and generate a control signal (114) for controlling a power output (128) from the power generating unit (102). The system (110) includes a signal acquisition unit (118), a power generation controller (120), a processor unit (122), and a memory unit (124) communicatively coupled to each other via a communications bus (126).

The signal acquisition unit (118) is communicatively coupled to the power generating unit (102) and configured to acquire at least two measurement data sets (112) from the location of integration (116) of the power generating unit (102) to the electrical grid (104). The at least two measurement data sets (112) include a first measurement data set corresponding to a first time instant and a second measurement data set corresponding to a second time instant. In other embodiments, more than two measurement data sets (112) corresponding to a plurality of time instants may be used. Each of the plurality of measurement data sets may include a plurality of parameters of the wind farm and from the location of integration (116). The signal acquisition unit (118) is configured to acquire the at least two measurement data sets (112) from the sensor module (130) having a plurality of sensors such as but not limited to current sensors, voltage sensors, and phasor measurement units (PMUs) (not shown in FIG. 1). In another embodiment, the signal acquisition unit (118) is configured to acquire measurement data from the power generating unit (102) and/or the one or more wind turbines (106).

In one embodiment, the signal acquisition unit (118) is configured to acquire at least one of a phasor current and a phasor voltage of each of the plurality of measurement data sets (112). The phasor measurement unit of the signal acquisition unit (118) may further be configured to measure an active power value and a reactive power value. In one embodiment, the first measurement data set includes a first phasor voltage represented by $V_i$, a first voltage angle represented by $\delta_i$, a first phasor current value represented by $I_i$, a first active power value represented by $P_i$, and a first reactive power value represented by a symbol $Q_i$. The index i is representative of the first time instant at which the first measurement data set is acquired. The second measurement data set includes a second phasor voltage represented by $V_k$, a second voltage angle represented by $\delta_k$, a second phasor current value represented by $I_k$, a second active power value represented by $P_k$, and a second reactive power value represented by a symbol $Q_k$. The index k is representative of the second time instant at which the second measurement data set is acquired. In one embodiment, the parameters such as first active power value $P_i$, the first reactive power value $Q_i$, the first phasor voltage $V_i$, and the first voltage angle $\delta_i$ are measured by a phase measuring unit (PMU) and the first phasor current value $I_i$ is computed based on the measured parameters of the first measurement data set. Similarly, the parameters such as the second active power value $P_k$, the second reactive power value $Q_k$, the second phasor voltage $V_k$, and the second voltage angle $\delta_k$ are measured and the second phasor current value $I_k$ is computed based on the measured parameters of the second measurement data set.

The power generation controller (120) is communicatively coupled to the signal acquisition unit (118) and configured to receive the at least two measurement data sets (112). The power generation controller (120) is further configured to generate a grid model of the electrical grid (104) based on the at least two measurement data sets (112). In one embodiment, the grid model is characterized by an equivalent grid voltage and an equivalent grid impedance. The power generation controller (120) is further configured to compute a strength value of the electrical grid (104) based on the grid model, using the at least two measurement data sets (112). The power generation controller (120) is also configured to control the power output (128) of the power generating unit (102) based on the strength value of the electrical grid (104). Specifically, the power generation controller (120) is configured to generate the control signal (114) for controlling the power output (128) of the power generating unit (102). The control signal (114) is representative of the strength value of the electrical grid (104). In some embodiments, wind turbine controllers may receive the strength value of the electrical grid and generate a control signal for controlling the power output of the corresponding wind turbine.

In one embodiment, the power generation controller (120) is further configured to select one measured phasor voltage among a plurality of phasor voltages of the plurality of measurement datasets (112) as a reference phasor voltage $V_{ref}$. In such an embodiment, an angle of a phasor voltages of the plurality of phasor voltages, with reference to the reference phasor voltage is determined as:

$$\delta'_i = \delta_i - \delta_{ref} \text{ for } i=1,2,3,\ldots n \qquad (1)$$

where $\delta_i$ is the $i^{th}$ voltage angle corresponding to $i^{th}$ measurement data set, $\delta_{ref}$ is the reference phasor voltage angle, and n is the number of measurement values. In one embodiment, a first phasor voltage $V_i$ of the first data measurement set is selected as a reference phasor voltage. It should be noted herein that in other embodiments, other phasor voltage among the plurality of phasor voltages may be selected as the reference phasor voltage. The first phasor current $I_i$ is represented by:

$$I_i = c_i + jd_i = \left(\frac{P_i + jQ_i}{V_i \angle \delta'_i}\right) \qquad (2)$$

where $c_i$ is real part of the current $I_i$ and $d_i$ is an imaginary part of the current $I_i$.

Figure 2:
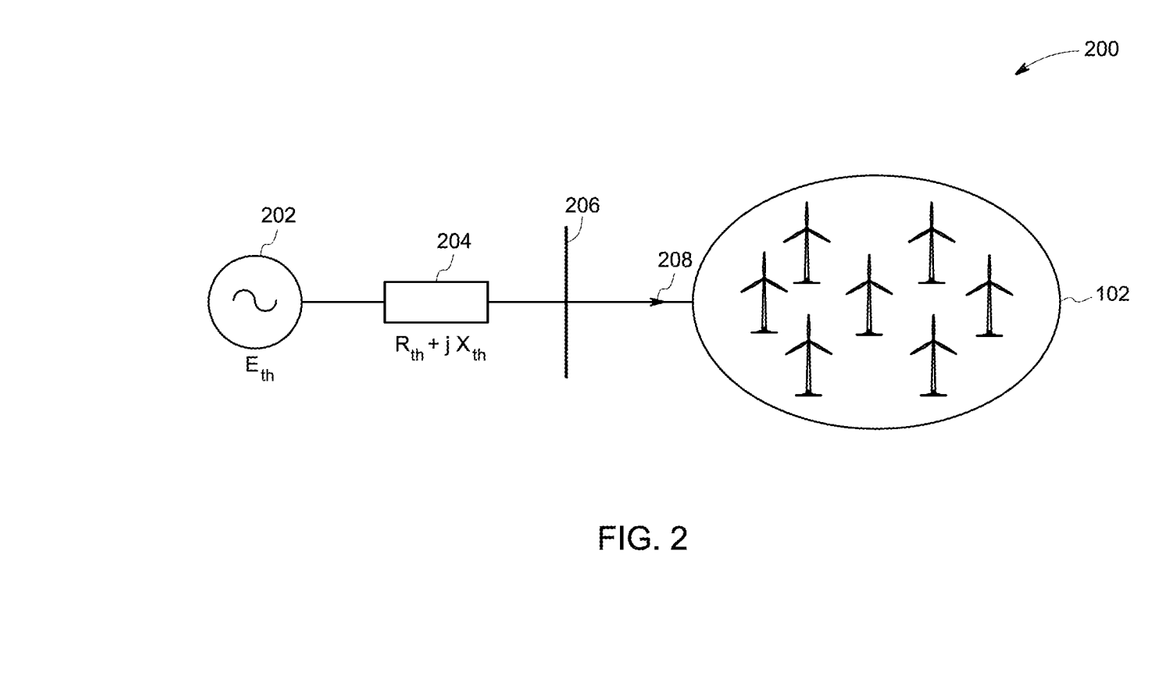
FIG. 2 is a circuit diagram representative of the electrical grid integrated with the power generating unit in accordance with the exemplary embodiment of FIG. 1.

The power generation controller (120) is further configured to model the first phasor voltage $V_i$ using a grid model at the location of contact of the wind farm with the power generating unit. The grid model is represented by FIG. 2 and is mathematically expressed as:

$$V_i = E_{th} - Z_{th} I_i \qquad (3)$$

where $V_i$ and $I_i$ are the first phasor voltage and first phasor current respectively at location of integration (116) of the electrical grid (104) with the power generating unit (102) at time instant i, $E_{th}$ is equivalent voltage of the electrical grid (104), and $Z_{th}$ is equivalent impedance of the electrical grid (104). The equation (3) may be expressed in an alternate form using equation (2) as:

$$V_i^{real} + jV_i^{imaginary} = e + jf - (R_{th} + jX_{th})(c_i + jd_i) \quad (4)$$

where $V_i^{real}$ and $V_i^{imaginary}$ are real and imaginary parts of phasor voltage $V_i$, e and f are real and imaginary parts of $E_{th}$, and $R_{th}$, and $X_{th}$ are real and imaginary parts of $Z_{th}$, c and d are real and imaginary part of $I_i$.

The equation (4) is represented in matrix form as:

$$\begin{bmatrix} 1 & 0 & -c_i & d_i \\ 0 & 1 & -d_i & -c_i \end{bmatrix} \begin{bmatrix} e \\ f \\ R_{th} \\ X_{th} \end{bmatrix}_i = \begin{bmatrix} V_i^{real} \\ V_i^{imaginary} \end{bmatrix} \quad (5)$$

The equation (5) corresponds to the first measurement data set at instant i. At least two measurement data sets (112) are required to determine the equivalent impedance and equivalent voltage of the electrical grid (104). The second measurement data set having the second phasor voltage $V_k$ and the second phasor current $I_k$ at time instant k is used as an additional measurement data set by the power generation controller (120) to modify the equation (5) as:

$$\begin{bmatrix} 1 & 0 & -c_i & d_i \\ 0 & 1 & -d_i & -c_i \\ 1 & 0 & -c_k & d_k \\ 0 & 1 & -d_k & -c_k \end{bmatrix} \begin{bmatrix} e \\ f \\ R_{th} \\ X_{th} \end{bmatrix}_i = \begin{bmatrix} V_i^{real} \\ V_i^{imaginary} \\ V_k^{real} \\ V_k^{imaginary} \end{bmatrix} \quad (6)$$

where, $c_k$ and $d_k$ are real and imaginary parts of the second phasor current $I_k$, $V_k^{real}$ and $V_k^{imaginary}$ are real and imaginary parts of second phasor voltage $V_k$. The equation (6) is a matrix equation representative of the grid model having a matrix at the left hand side referred herein as 'coefficient matrix' and a column matrix at the right hand side referred herein as 'measurement vector'. The matrix equation (6) includes a plurality of linear equations corresponding to a plurality of rows of the matrix. It may be noted that in certain other embodiments, more than two measurement data sets may be used in the grid model of equation (6) to add more number of rows in the matrix equation.

The power generation controller (120) is further configured to determine a least squares solution to the matrix equation (6). The power generation controller (120) may be further configured to implement one of a recursive least square technique and a least mean square technique or determine a pseudo inverse for solving the matrix equation (6) to determine the equivalent grid voltage and the equivalent grid impedance. The power generation controller (120) is further configured to determine a short circuit current value as a ratio of the equivalent grid voltage and the equivalent grid impedance. The short circuit current value is represented by:

$$I_{sc} = \left| \frac{E_{th}}{Z_{th}} \right| \quad (7)$$

where $I_{sc}$ is the short circuit current value and the function $|E_{th}/Z_{th}|$ is representative of modulus of the ratio of the equivalent grid voltage to the equivalent grid impedance. Further, a short circuit ratio is determined by:

$$SCR = \frac{kV_{ref} I_{sc}}{MW_{farm}} \quad (8)$$

where SCR is the short circuit ratio representative of strength of the electrical grid (104), k is a constant and $V_{ref}$ is the reference voltage, and $MW_{farm}$ is the rated capacity of the power generating unit. In certain embodiments where the reference voltage is a phase voltage, the constant k is equal to three. In certain other embodiments where the reference voltage is a line voltage, the constant k is equal to square root of three. The numerator of equation (8) is representative of the short circuit capacity and the denominator of the equation (8) is representative of the capacity of the power generating unit.

The memory unit (124) is communicatively coupled to the communication bus (126) and may be accessed by at least one of the signal acquisition unit (118) and the power generation controller (120). In one exemplary embodiment, the memory unit (124) includes one or more memory modules. The memory unit (124) may be a non-transitory storage medium. For example, the memory unit (124) may be a dynamic random access memory (DRAM) device, a static random access memory (SRAM) device, a digital versatile disc read only memory (DVD-ROM) device, a digital versatile rewritable (DVD-RW) device, a flash memory device, or other non-volatile storage devices. In one embodiment, a non-transitory computer readable medium encoded with a program having instructions may be used to enable the processor unit (122) to perform functions of one or more of the signal acquisition unit (118) and the power generation controller (120).

The processor unit (122) is communicatively coupled to the communications bus (126) and may include at least one or an arithmetic logic unit, a microprocessor, a general purpose controller, and a processor array to perform the desired computations or run the computer programs. In one embodiment, the processor unit (122) may be configured to aid the signal acquisition unit (118) and the power generation controller (120) to perform the associated tasks. It may be noted that while the embodiment of FIG. 1 depicts the processor unit (122) as a separate unit, in certain embodiments, one or more of the signal acquisition unit (118), and the power generation controller (120) many include at least one processor unit.

The system (110) is configured to determine the strength value of the electrical grid (104) in real-time. The system (110) is capable of determining the strength value based on the at least two measurement data sets (112) acquired through measurements at a location of the windfarm. The power generation controller (120) is further configured to improve operational capability of the plurality of wind turbines (106) based on the strength value. In one embodiment, the power generation controller (120) is configured to modify operating point of the one or more wind turbines (106) of the windfarm based on the short circuit ratio SCR of the electrical grid (104). In alternate embodiments, power output of the windfarm may be controlled based on the SCR of the electrical grid (104). The power output of the wind farm is modified by a windfarm controller and the power output from one wind turbine (106) may be controlled by a corresponding wind turbine controller, using the strength value SCR estimated in real-time. In one embodiment, the control of power output is performed by changing one or more operating parameters of the one or more turbines (106) to enhance the power transfer to the electrical grid (104). A power control technique among a plurality of known techniques such as, but not limited to, a pitch control technique, an active stall control technique, and a yaw control technique may be employed by the windfarm controller or by the wind turbine controllers. In one embodiment, system (110) is configured to determine the strength value at every second of operation. In some embodiments, the system (110) is incorporated in the existing windfarm controller. The system (110) regulates the farm power curtailment and enhances annual energy production (AEP) from the windfarm to the electrical grid (104).

FIG. 2 is a circuit diagram (200) representative of the electrical grid (104) integrated with the power generating unit (102) in accordance with the exemplary embodiment of FIG. 1. The circuit diagram (200) includes an equivalent voltage source (202) representative of the electrical grid (104). In one embodiment, the equivalent voltage source (202) is representative of a radial bus system. In another embodiment, the equivalent voltage source (202) is representative of a mesh system. The circuit diagram (200) further includes equivalent impedance (204) obtained from the location of integration (116) of the power generating unit (102) to the equivalent voltage source (202) representative of the electrical grid (104). A phasor voltage (206) and a phasor current (208) are measured at the location of integration (116) of the power generating unit (102) with the electrical grid (104). The grid model of equation (3) is determined based on the circuit diagram (200). In one embodiment, computing the strength value includes determining the equivalent grid voltage and the equivalent grid impedance. The phasor voltage (206) and the phasor current (208) are measured by the PMU at a plurality of time instants to generate the plurality of measurement data sets (112). The plurality of measurement data sets (112) is processed by the power generation controller (120) to determine (or estimate) the equivalent voltage source (202) and the equivalent impedance (204). The equivalent voltage source (202) and the equivalent impedance (204) are further used to determine the strength value of the electrical grid (104). The short circuit current value is determined using equation (7) having the estimated equivalent impedance (204) and equivalent voltage source (202). Further, the strength value is determined using equation (8) with the estimated short circuit current value.

Figure 3:
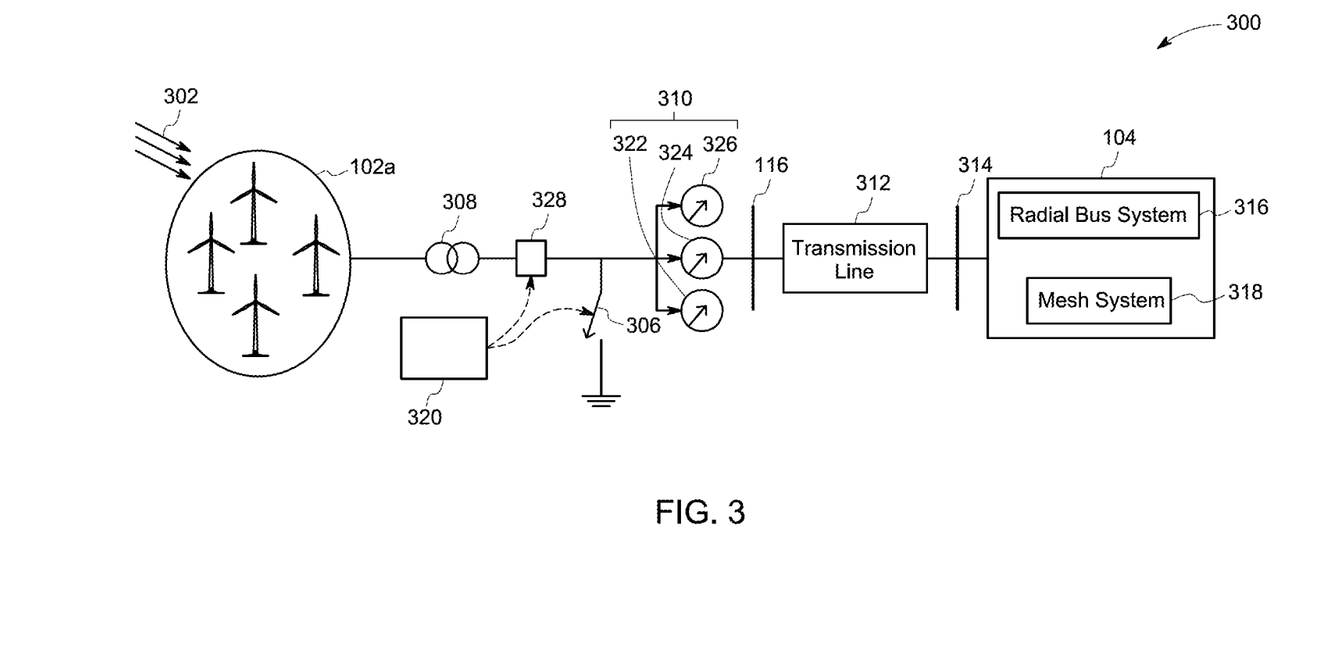
FIG. 3 is schematic diagram of a simulation model for validating a system strength at location of integration of a power generating unit in accordance with an exemplary embodiment.

FIG. 3 is schematic representation of a simulation model (300) for validating the system strength at a location of integration (116) of the power generating unit (102) in accordance with the exemplary embodiment of FIG. 1. The simulation model (300) is representative of a commercial simulation package of the power system (100). The simulation model includes at least a subset of wind turbines (102) a among the plurality of wind turbines (106) subjected to a wind front (302). The simulation model (300) may further include a plurality of transformers (308) and a plurality of measuring instruments (310) as part of the sensor module (130) of FIG. 1. In the illustrated embodiment, the measuring instruments (310) include but not limited to a voltage sensor (322), a current sensor (324), and a phasor measurement unit (PMU) (326). The simulation model (300) is configured to create a short circuit fault at the location of integration (116) of the power generating unit (102) with the electrical grid (104) for a predetermined time period. The short circuit fault may be introduced into the simulation model through a controllable switch (306) and a switch control unit (320). The power generating unit (102) is isolated from the grid (104) using a circuit breaker (328) to avoid fault current contribution from the farm, for the duration of the short circuit fault. In one embodiment, the current sensor (324) is configured to measure a short circuit current when the short circuit fault is simulated in the simulation model (300). Further, the voltage sensor (322) is configured to measure a pre-fault voltage before the short circuit fault is simulated in the simulation model (300). The simulation model (300) also includes a transmission line (312) extending between the location of integration (116) and a bus (314). In one embodiment, the electrical grid (104) is represented by a radial bus system (316). In another embodiment, the electrical grid (104) is represented by a mesh system (318).

A SCR value is computed based on the measured short circuit current and the pre-fault voltage. The plurality of parameters such as, but not limited to, the current, voltage, active power, reactive power and phase angles are measured at the location of the integration of windfarm to the grid (104) using sensors or meters for the entire duration of simulation. The simulation is performed by varying the length of the transmission line (312) to vary the impedance of the grid (104). The SCR values may also be estimated based on the measured phasor currents and measured phasor voltages for each simulation case. The calculated value of SCR is compared with the estimated value of SCR to evaluate the effectiveness of the disclosed technique.

Figure 4:
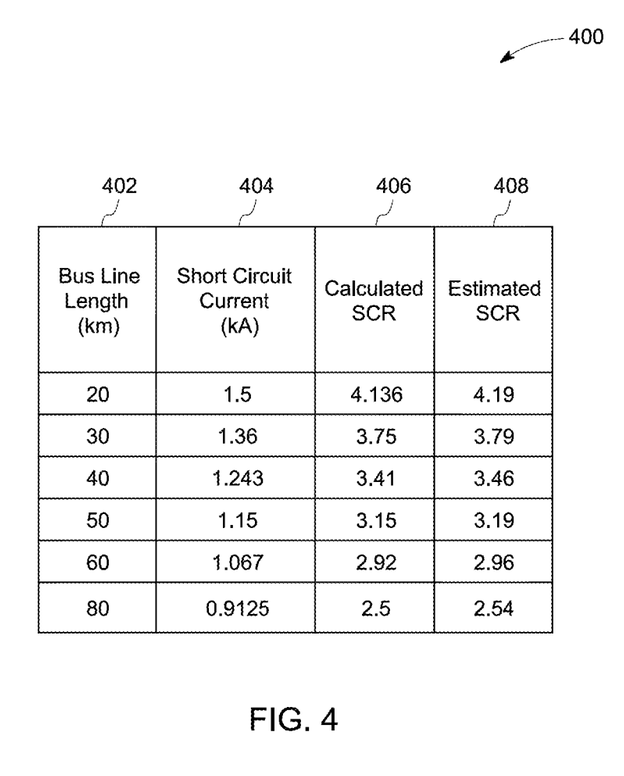
FIG. 4 is a table of short circuit ratio values generated by the simulation model represented by FIG. 3 for a radial bus system and corresponding estimated values in accordance with an exemplary embodiment.

FIG. 4 is a table (400) of short circuit ratio values generated by the simulation model represented by FIG. 3 for a radial bus system and corresponding estimated values in accordance with an exemplary embodiment. The table (400) includes a first column (402) representative of bus length in kilometers, and a second column (404) representative of short circuit current in kilo amperes (kA) measured when the short circuit fault is simulated at the location of integration (116) of the power generating unit (102) with the electrical grid (104). The table (400) further includes a third column (406) representative of the calculated SCR values and a fourth column (408) representative of the estimated SCR values. In the illustrated embodiment, for bus line lengths varying from 20 kms to 80 kms, there is a close match between the calculated SCR values in the third column (406) and estimated SCR values in the fourth column (408).

Figure 5:
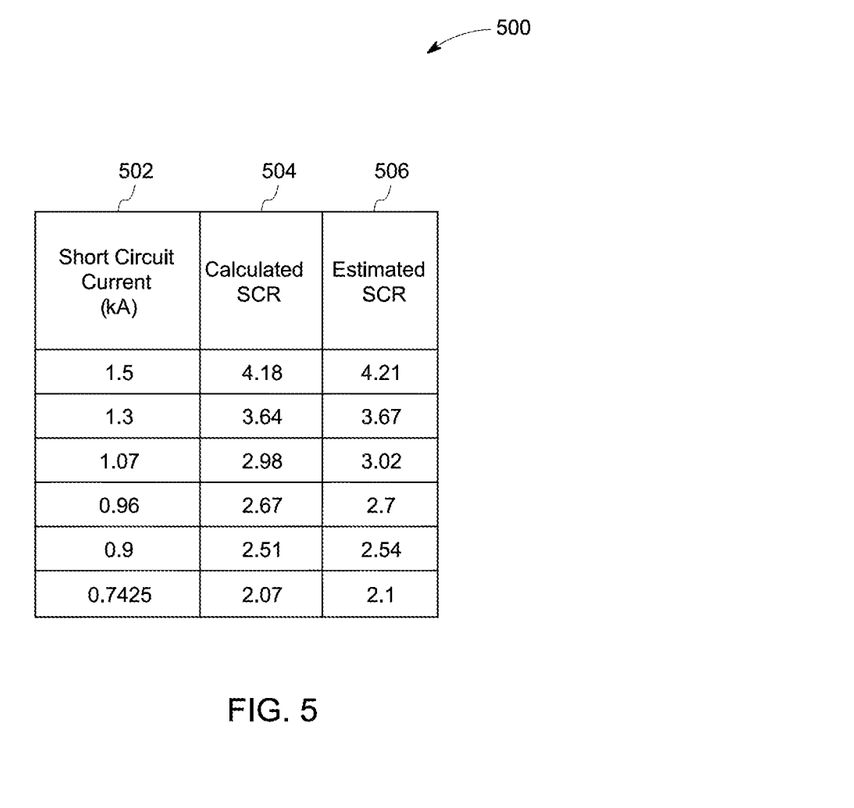
FIG. 5 is a table of short circuit ratio values generated by the simulation model represented by FIG. 3 for a mesh system and corresponding estimated values in accordance with another exemplary embodiment.

FIG. 5 is table (500) of short circuit ratio values generated by the simulation model represented by FIG. 3 for a mesh system and corresponding estimated values in accordance with another exemplary embodiment. The table (500) includes a first column (502) representative of short circuit current in kilo amperes (kA) measured when the short circuit fault is simulated at the location of integration (116) of the power generating unit (102) with the electrical grid (104), a second column (504) representative of calculated SCR values, and a third column (506) representative of estimated SCR values. For the short circuit current values in a range of 0.74 kilo amperes to 1.5 kilo amperes, there is a close match between the calculated SCR values in the second column (504) and estimated SCR values in the third column (506). It may be noted herein that the calculated SCR values and estimated SCR values is within 2% of the estimated SCR values.

Figure 6:
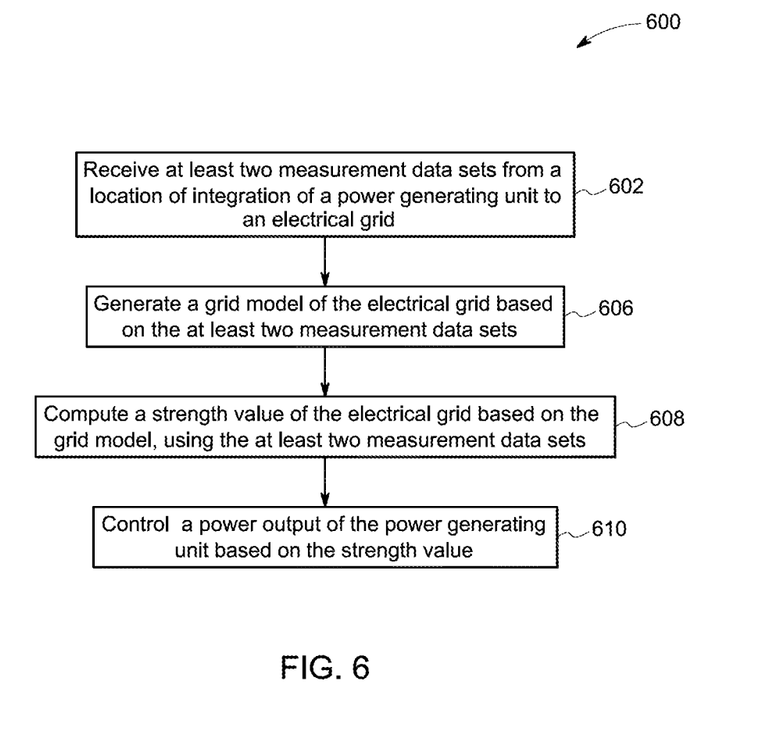
FIG. 6 is a flow chart of a method for effectively controlling a power generating unit integrated with an electrical grid in accordance with an exemplary embodiment.

FIG. 6 is a flow chart (600) illustrating a method for effectively controlling a power generating unit integrated with an electrical grid in accordance with an exemplary embodiment. The method includes receiving at least two measurement data sets from a location of integration of the power generating unit to the electrical grid as represented by step (602). Each measurement data set among the plurality of measurement data sets includes a plurality of electrical parameters. In one embodiment, each measurement data set includes at least one of a phasor current and a phasor voltage. In some embodiments, each of the measurement data set may further include or be used to obtain an active power value and a reactive power value.

The method further includes generating a grid model of the electrical grid based on the at least two measurement data sets as in step (606). In one embodiment, the grid model is characterized by an equivalent grid voltage and an equivalent grid impedance. More specifically, generating the grid model may include formulating a plurality of linear equations based on the least two measurement data sets. For example, in one embodiment, a matrix equation is generated using a plurality of phasor current measurement data sets and a plurality of phasor voltage measurement data sets. The plurality of phasor current measurement data sets may be used to generate the left matrix and the plurality of phasor voltages may be used to generate the measurement vector with reference to equation (6) mentioned above.

Further in step (608), the method also includes computing a strength value of the electrical grid based on the grid model, using the at least two measurement data sets. In one embodiment, real and imaginary parts of equivalent grid voltage and equivalent grid impedance are determined using a least squares solution of the grid model. More specifically, a short circuit current, which is defined as a ratio of the equivalent grid voltage to the equivalent grid impedance, may be determined. In such an embodiment, computing of the strength value includes determining a short circuit ratio of the electrical grid in real time based on the short circuit current and a reference voltage. In one embodiment, a short circuit ratio, which is a ratio of short circuit MVA to the windfarm capacity, is determined as the strength value of the electrical grid. The term 'short circuit MVA' refers to the product of short circuit current and the pre-fault voltage. In general, the short circuit ratio is a ratio of short circuit capacity of the electrical grid to the capacity of the power generating unit.

The method also includes controlling a power output of the power generating unit based on the strength value in step (610). In one embodiment, controlling the farm power output includes at least one of terminating operation of a wind turbine from a plurality of wind turbines of the power generating unit, modifying operating parameters of one or more wind turbines of the power generating unit, and controlling other electrical equipment at the location of integration of the wind farm.

In accordance some embodiments, a single PMU is sufficient for acquiring a plurality of phasor voltage measurements, and one of the phasor voltages among the plurality of phasor voltage measurements is used as the reference voltage. In accordance some embodiments, only local measurements acquired at the location of integration of the power generating unit with the electric grid are required.

Embodiments of the disclosed technique may be part of a control system configured to control a wind turbine, or a wind farm or any other power generating unit connected to an electrical grid. In one embodiment, such a control system may be integrated with a cloud based software platform. In another embodiment, the control system may be integrated with a software model of a wind turbine or a wind farm (digital twin of a wind turbine or a wind farm). In another embodiment, the disclosed technique may be used for a digital wind farm based on digital assets and a cloud based software platforms. It may also be noted herein that the disclosed embodiments may be used for internet of things (IoT) which enables digital industrial solutions/technologies such as, but not limited to, big-data and deep learning advancements in the energy sector. Embodiments of the disclosed technique enable comprehensive optimized offerings during designing, deployment and operation of large scale wind farms It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method for controlling a wind farm comprising a plurality of wind turbines coupled to an electrical grid based on a strength value of the electrical grid computed in real time, the method calling for only a single phasor measurement unit, the method comprising:

during real time operation of the plurality of wind turbines of the wind farm supplying active power to the electrical grid, receiving from a single phasor measurement unit at least two measurement data sets from a location of integration of the wind farm to the electrical grid, wherein each of the at least two measurement data sets from the single phasor measurement unit comprises a plurality of electrical parameters comprising an active power value, a reactive power value, a phasor current value, and a plurality of phasor voltage values, wherein a first one of the measurement data sets is taken at a first real time instant and a second one of the measurement data sets is taken at a second real time instant;

generating a grid model of the electrical grid in real time based on the at least two measurement data sets, wherein generating the grid model in real time comprises selecting a reference phasor voltage among the plurality of phasor voltages of the at least two measurement data sets from the single phasor measurement unit, and wherein the grid model is characterized by an equivalent grid voltage and an equivalent grid impedance computed by solving a matrix equation representative of the grid model and the at least two measurement data sets from the single phasor measurement unit;

computing the strength value of the electrical grid based on the grid model by determining a ratio of a short circuit power capacity to a power capacity of the wind farm, wherein the short circuit power capacity is a function of the selected reference phasor voltage and a short circuit current value, and wherein the short circuit current value is equal to a modulus of a ratio of the equivalent grid voltage to the equivalent grid impedance computed by solving the matrix equation;

terminating operation of a wind turbine from the plurality of wind turbines of the windfarm; and modifying operating parameters of one or more wind turbines of the windfarm based on the strength value of the electrical grid to control a power output of the wind farm.

2. The method of claim 1, wherein the computing the strength value comprises determining a least squares solution for the matrix equation.

3. A system for controlling a wind farm comprising a plurality of wind turbines coupled to an electrical grid based on a strength value of the electrical grid computed in real time, the system comprising:

a signal acquisition unit comprising a single phasor measurement unit communicatively coupled to the windfarm and configured to acquire, from the single phasor measurement unit, during real time operation of the plurality of wind turbines of the wind farm supplying active power to the electrical grid, at least two measurement data sets from a location of integration of the wind farm to the electrical grid, wherein each of the at least two measurement sets from the single phasor measurement unit of the signal acquisition unit comprises a plurality of electrical parameters comprising an active power value, a reactive power value, a phasor current value, and a plurality of phasor voltage values, wherein a first one of the measurement data sets is taken at a first real time instant and a second one of the measurement data sets is taken at a second real time instant; and a power generation controller communicatively coupled to the wind farm and the signal acquisition unit and configured to:

receive the at least two measurement data sets from the single phasor measurement unit of the signal acquisition unit;

generate a grid model of the electrical grid in real time based on the at least two measurement data sets, wherein generating the grid model in real time comprises selecting a reference phasor voltage among the plurality of phasor voltages of the at least two measurement data sets from the single phasor measurement unit of the signal acquisition unit, and wherein the grid model is characterized by an equivalent grid voltage and an equivalent grid impedance computed by solving a matrix equation formed from the at least two measurement data sets from the single phasor measurement unit of the signal acquisition unit;

compute the strength value of the electrical grid based on the grid model by determining a ratio of a short circuit power capacity to a power capacity of the wind farm, the short circuit power capacity being a function of the selected reference phasor voltage and a short circuit current value, wherein the short circuit current value is equal to a modulus of the ratio of the equivalent grid voltage to the equivalent grid impedance computed by solving the matrix equation;

terminate operation of a wind turbine from the plurality of wind turbines of the windfarm; and modify operating parameters of one or more wind turbines of the windfarm based on the strength value of the electrical grid to control a power output of the wind farm.

4. The system of claim 3, wherein the matrix equation is based on a plurality of linear equations.

* * * * *